US009333921B1

(12) United States Patent
Greene et al.

(10) Patent No.: US 9,333,921 B1
(45) Date of Patent: May 10, 2016

(54) SEAT-MOUNTED RACK ASSEMBLY

(71) Applicants: Andrew T. Greene, Saint Helena, CA (US); Jonathan D. Oxford, Albany, CA (US); Michele E. Parr, San Francisco, CA (US)

(72) Inventors: Andrew T. Greene, Saint Helena, CA (US); Jonathan D. Oxford, Albany, CA (US); Michele E. Parr, San Francisco, CA (US)

(73) Assignee: FourLane, LLC, San Francisco, CA (US)

( * ) Notice: Subject to any disclaimer, the term of this patent is extended or adjusted under 35 U.S.C. 154(b) by 0 days.

(21) Appl. No.: 14/575,040

(22) Filed: Dec. 18, 2014

(51) Int. Cl.
*B60R 7/04* (2006.01)
*B60R 11/00* (2006.01)

(52) U.S. Cl.
CPC ............... *B60R 7/043* (2013.01); *B60R 11/00* (2013.01); *B60R 2011/0017* (2013.01); *B60R 2011/0059* (2013.01)

(58) Field of Classification Search
CPC .. B60R 7/04; B60R 7/043; B60R 2011/0003; B60R 2011/0017
See application file for complete search history.

(56) References Cited

U.S. PATENT DOCUMENTS

| | | | |
|---|---|---|---|
| 2,640,634 A | 6/1953 | Francis | |
| 2,721,680 A | 10/1955 | Steckman | |
| 3,465,930 A | 9/1969 | La Croix | |
| 4,022,362 A * | 5/1977 | Revercomb | 224/324 |
| 4,029,246 A * | 6/1977 | Woodruff | 224/275 |
| 4,369,009 A * | 1/1983 | Fulford | 410/35 |
| 4,396,138 A * | 8/1983 | Kirschner | 224/318 |
| 4,681,247 A * | 7/1987 | Prosen | 224/322 |
| 4,765,521 A * | 8/1988 | Finnegan | 224/315 |
| 4,954,030 A * | 9/1990 | Szucs et al. | 410/96 |
| 4,961,524 A * | 10/1990 | Hunts | 224/324 |
| 4,989,836 A * | 2/1991 | Hudson et al. | 297/391 |
| 5,076,479 A * | 12/1991 | Davison | 224/324 |
| 6,076,880 A | 6/2000 | Coffer et al. | |
| 6,260,750 B1 * | 7/2001 | Chiang | 224/275 |
| 6,601,914 B1 * | 8/2003 | Seastrom | 297/188.06 |
| 7,032,974 B1 * | 4/2006 | Berger | 297/398 |
| 7,165,809 B2 * | 1/2007 | Downey | 297/253 |
| 7,517,017 B1 * | 4/2009 | Liberkowski | 297/253 |
| 7,611,184 B1 | 11/2009 | Bisson et al. | |
| 7,845,597 B2 * | 12/2010 | Gatta | 248/58 |
| D646,214 S * | 10/2011 | Mulanon | D12/406 |
| 8,517,237 B1 * | 8/2013 | Barber | 224/316 |
| 2003/0150892 A1 | 8/2003 | Hoe | |
| 2004/0104614 A1 * | 6/2004 | Higley et al. | 297/452.4 |
| 2005/0224540 A1 | 10/2005 | Chen | |
| 2006/0138850 A1 | 6/2006 | Downey | |
| 2006/0226322 A1 | 10/2006 | Spellman | |
| 2010/0090076 A1 * | 4/2010 | Brawner | 248/224.8 |
| 2011/0101055 A1 | 5/2011 | O'Neill et al. | |

(Continued)

OTHER PUBLICATIONS

Stonehaven Life Car Lumber Rack Headrest Hack. Jul. 3, 2014. [Retrieved on Jan. 28, 2016.] Retrieved from the Internet: <http://stonehavenlife.com/car-lumber-rack-headrest-hack/>.

(Continued)

*Primary Examiner* — Brian D Nash
(74) *Attorney, Agent, or Firm* — Edward S. Wright

(57) ABSTRACT

Seat-mounted rack assembly for carrying elongated loads in automobiles and other passenger vehicles. The assembly includes a pair of rack units mounted on the backs of two seats in the vehicle in place of headrests, with each of the rack units having a horizontally extending base on which an end portion of the load can rest, a mounting post extending downwardly from the base and into a headrest support socket in the seat back, and a tie down strap for securing the load to the base.

15 Claims, 4 Drawing Sheets

(56) References Cited

U.S. PATENT DOCUMENTS

2011/0114685 A1 5/2011 Cottrell et al.
2012/0286008 A1 11/2012 Ackeret et al.
2013/0037672 A1 2/2013 Sanchez
2013/0119714 A1 5/2013 Cottrell et al.
2014/0001217 A1 1/2014 Jolda et al.

OTHER PUBLICATIONS

Etrailer. Thule AeroBlade Load Bars. Jul. 20, 2013. [Retrieved on Jan. 28, 2016.] Retrieved from the Internet: <http://www.etrailer.com/Roof-Rack/Thule/THARB47.html>.

* cited by examiner

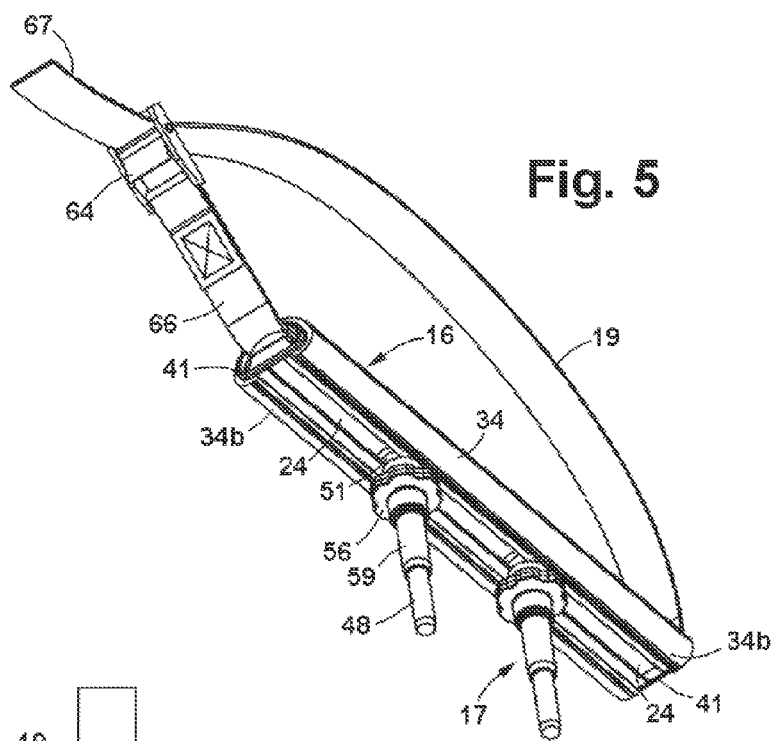
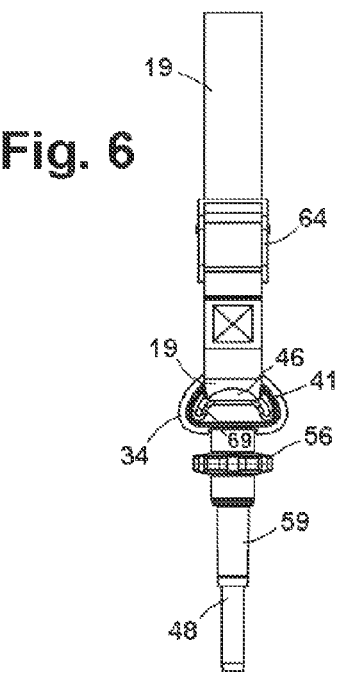
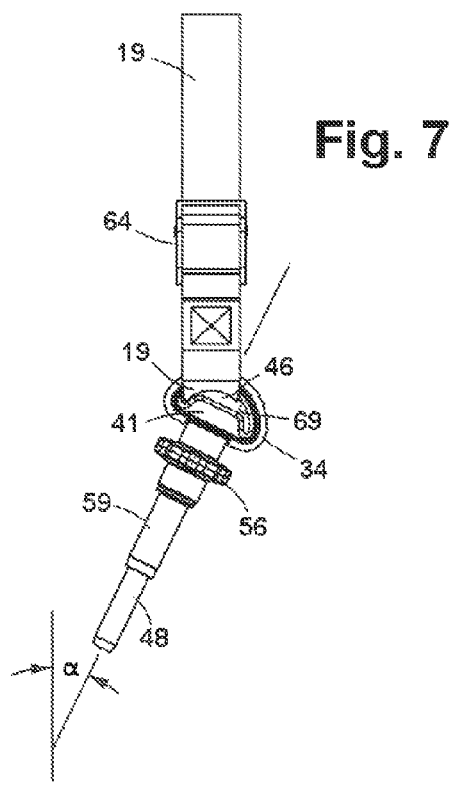

SEAT-MOUNTED RACK ASSEMBLY

BACKGROUND OF THE INVENTION

1. Field of Invention

This invention pertains generally to the transportation of elongated loads in passenger vehicles and, more particularly, to a seat-mounted rack assembly for transporting elongated loads in automobiles and other passenger vehicles.

2. Related Art

When the driver of an automobile or other passenger wants to carry an elongated object or load, such as a stack of lumber, he usually has to try to tie it onto the outside of the vehicle or carry it loosely within the vehicle where in can fly about and damage the vehicle or injure persons within it. While some cars have rooftop luggage racks, many do not, and most car racks are not designed to carry long objects such as lumber.

SUMMARY OF THE INVENTION

The invention provides a seat-mounted rack assembly for carrying elongated loads in automobiles and other passenger vehicles. The assembly comprises a pair of rack units mounted on the backs of two seats in the vehicle in place of headrests, with each of the rack units having a horizontally extending base on which an end portion of the load can rest, a mounting post extending downwardly from the base and into a headrest support socket in the seat back, and a tie down strap for securing the load to the base.

BRIEF DESCRIPTION OF THE DRAWINGS

FIG. 5 is a bottom isometric view of the embodiment of FIG. 2.

FIGS. 6 and 7 are operational views of the embodiment of FIG. 2.

DETAILED DESCRIPTION

Figure 1:
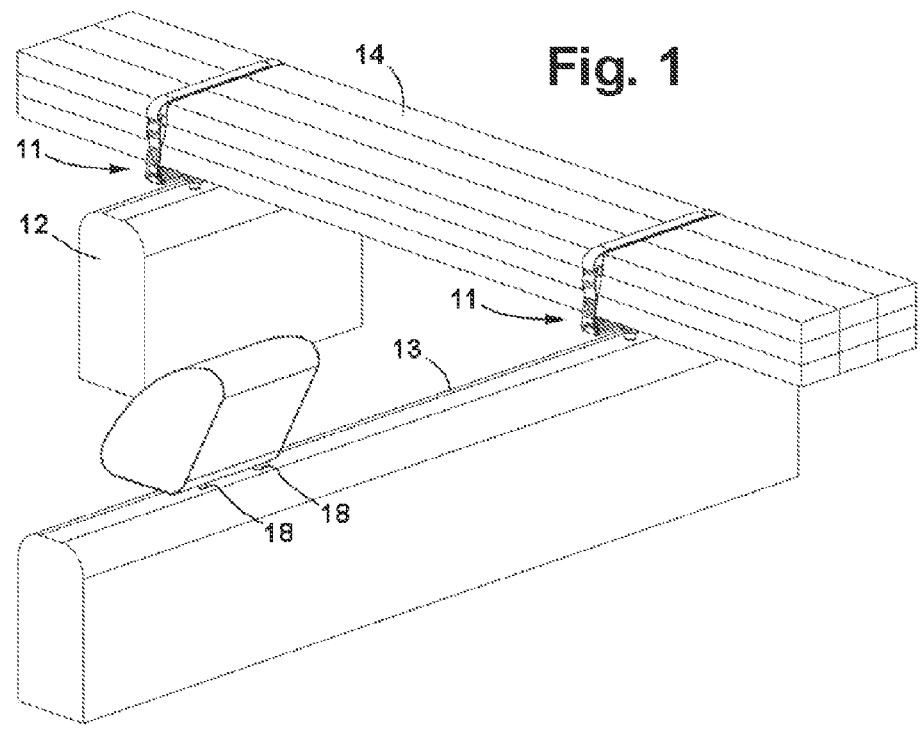
FIG. 1 is an isometric view of one embodiment of a rack assembly according to the invention mounted on the seats of an automobile.
Figure 2:
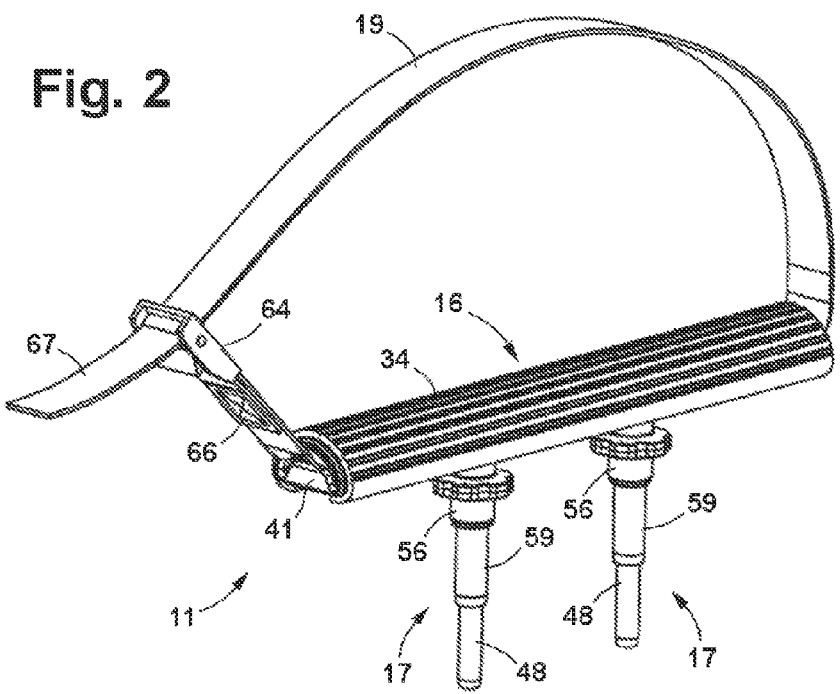
FIG. 2 is an isometric view of one of the rack units in the embodiment of FIG. 1.
Figure 3:
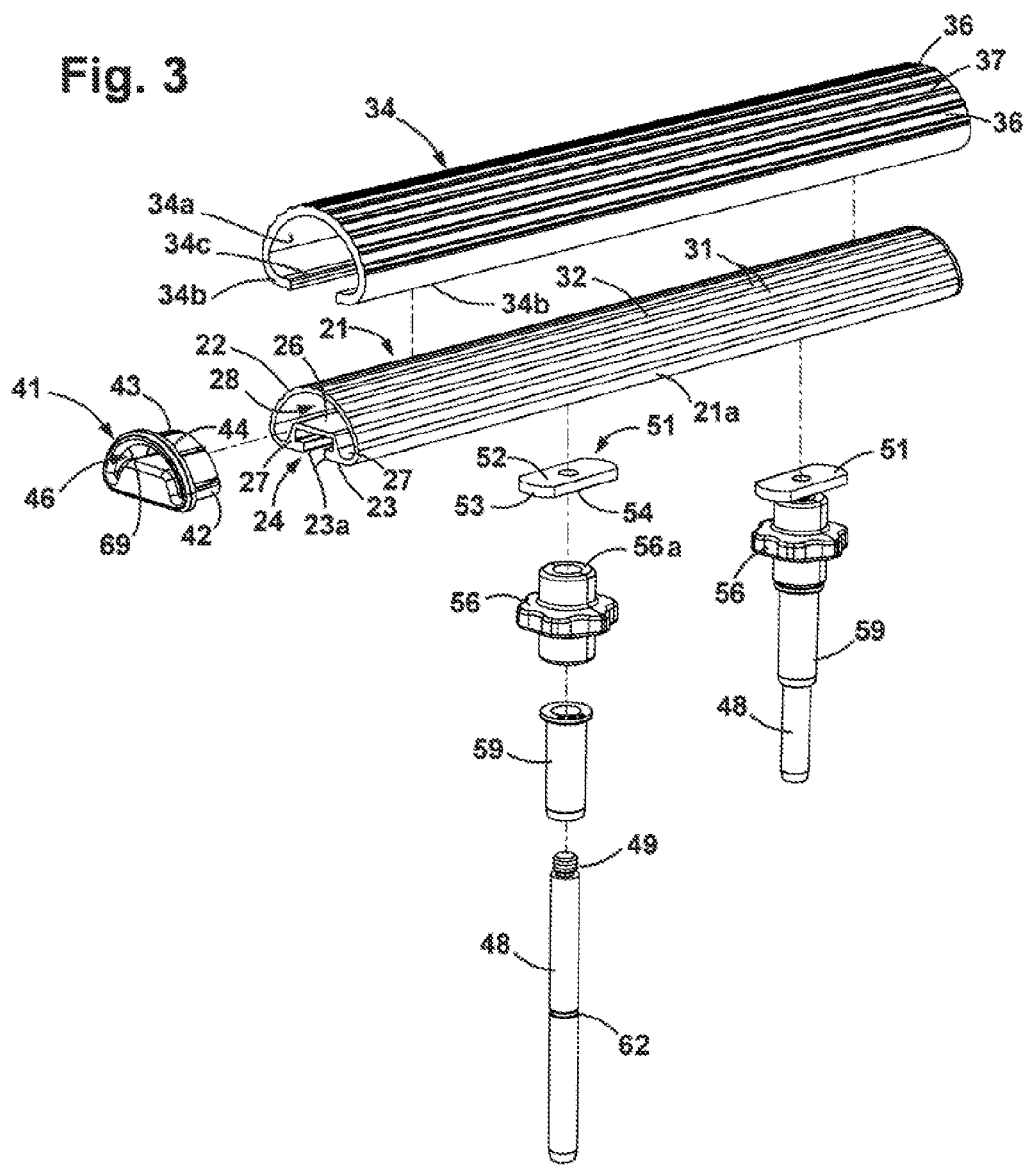
FIG. 3 is an exploded isometric view of the embodiment of FIG. 2.
Figure 4:
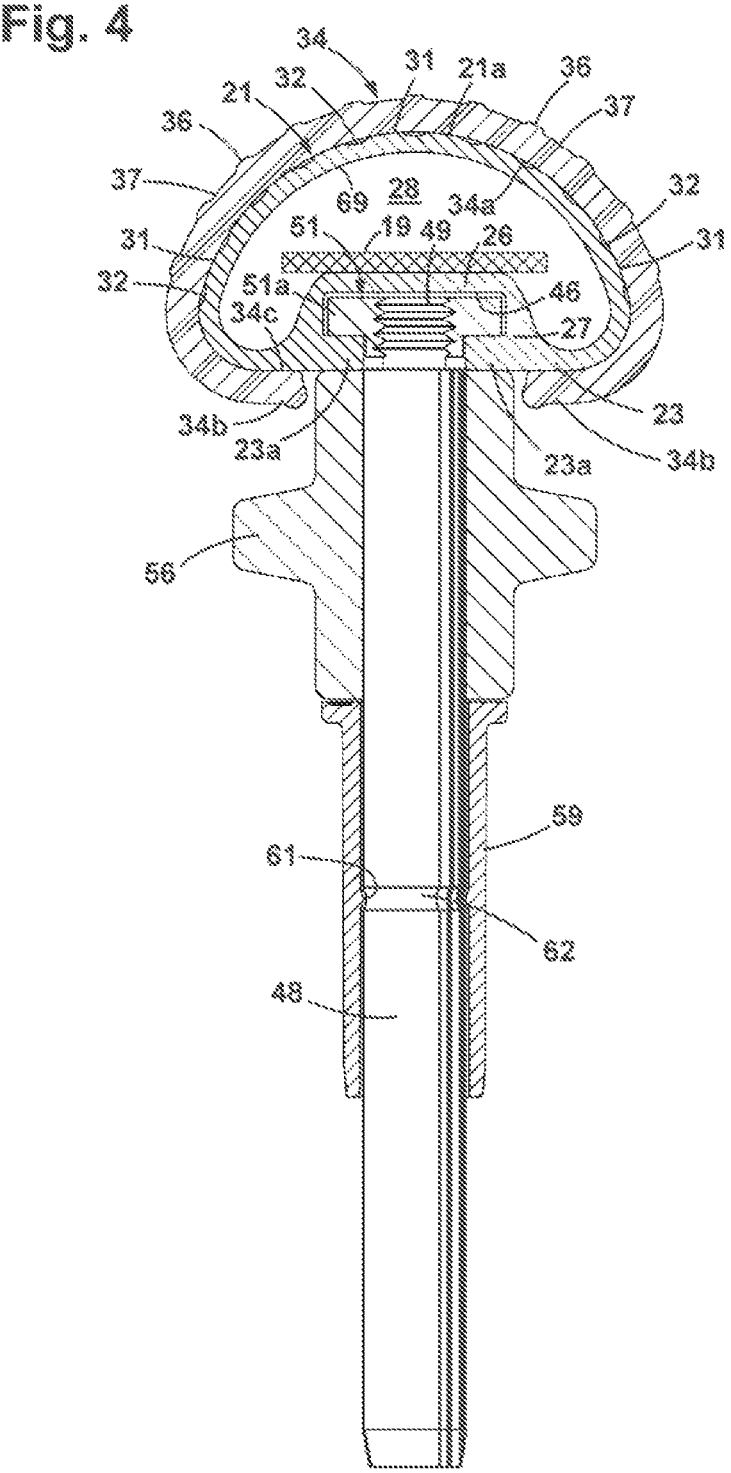
FIG. 4 is a vertical sectional view of the embodiment of FIG. 2.

As illustrated in FIG. 1, the rack assembly consists of two substantially identical rack units 11, 11 which are mounted on the backs 12, 13 of the front and rear seats of an automobile or other passenger vehicle in place of the headrests. In the example of FIG. 1, a load of lumber 14 is shown as being carried on the rack assembly.

Each of the rack units has a horizontally extending base 16 upon which an end portion of the load rests, a pair of support posts 17, 17 which extend downwardly from the base and are received in the sockets 18, 18 for the headrest posts, and a tie down strap 19 which wraps about the load and secures it to the base.

The base has an elongated base member or body 21 which extends in a direction parallel to the seat back and is fabricated of a rigid material that is strong enough to support the weight of the load resting thereon. In the embodiment illustrated, the body has a generally semi-cylindrical outer contour with a curved upper wall 22 and a relatively flat bottom wall 23. A T-shaped slotted opening 24 extends lengthwise of the base in the lower portion of the body. This opening is defined by a top wall 26, side walls 27, and inner edge portions 23a of bottom wall 23 which extend inwardly of the side walls on opposite sides of the opening. The walls of the T-shaped opening and the walls of the body also form a generally semi-annular or crescent-shaped chamber or channel 28 that extends lengthwise of the body in the upper portion of the base. The outer surface 21a of the body has a plurality of longitudinally extending ridges or ribs 31 with grooves 32 between them. In one presently preferred embodiment, body 21 is formed as a unitary structure by extrusion of a suitable material such as aluminum.

The base also includes a protective cover 34 which is mounted on the body to prevent damage to sensitive loads as well as providing traction that keeps loads from sliding around on the base. In the embodiment illustrated, the cover is a rubber extrusion of semi-annular cross section, with an inner surface 34a in mating engagement with the outer surface 21a of the body. The outer surface of the cover has a plurality of longitudinally extending ribs or cleats 36 spaced peripherally apart with shallow grooves 37 between them.

The cover is removably mounted on the body, with lateral edge portions 34b of the cover hooking beneath the outer edge portions of the body and upwardly facing flat surfaces 34c in mating engagement with the outer edge portions 23b of the bottom wall of the body. The cover can either be slid lengthwise onto and off of the body, or it can be snapped onto and off of the body.

End caps 41 are attached to the end portions of base member 21. Each end cap has a body 42 which extends into channel 28 and has a contour corresponding to that of the channel, with longitudinally extending ribs 43 on the body providing a tight, frictional fit with the walls of the channel. Each end cap also has a radial flange 44 at the outer end of its body which abuts against the ends of base member and cover and an opening 46 of generally semi-annular or crescent shaped contour similar to that of the channel. In one present embodiment, the end caps are fabricated of a polycarbonate material, but they can also be fabricated of other suitable materials, if desired.

Support posts 17 have metal rods or shafts 48 which are inserted into the sockets 18 which normally receive the supporting posts of a headrest. Each shaft has an upper end section 49 of reduced diameter which is externally threaded and received in a T-nut 51. The T-nut has a generally rectangular body 52 with rounded ends 53 and circular hub 54 on its under side, and is slidably received in the T-shaped slot 24 in base member 21.

A knob or handle 56 is affixed to the upper portion of the shaft just below threaded section 49, with the upper end 56a of the knob engaging the lower surface of the bottom wall 23 of base member 21. In one present embodiment, the knob is fabricated of a polycarbonate material and molded onto the shaft.

Interchangeable adapter sleeves 59 are removably mounted on the support post shafts to accommodate headrest sockets of different diameters. These sleeves are mounted on the shafts just below the knobs and are retained in position by radially projecting detent rings 61 on the sleeves which are received in detent slots 62 in the shafts. The adapter sleeves can be fabricated of a polycarbonate or other suitable material.

Tie down strap 19 extends through the channel 28 in base member 21 and is wrapped about the load to secure it to the base. The strap has a buckle 64 at one end 66 for engagement with the other end portion 67 to secure the strap in position about the load. In the embodiment illustrated, the buckle is a cam buckle which can be engaged with the strap at any desired position along its length.

In use, the posts are attached loosely to the base with the proper size adapter sleeves in place and inserted into the sockets in the seat back. Once the posts are installed, the base can be positioned as desired on them and the knobs turned to tighten the screws and secure the base to the posts, with the edge portions 23a of the bottom wall of the base member being firmly clamped between the bodies 52 of the T-nuts and the upper ends 56a of knobs 56.

With the racks are mounted on the seats, the load can be placed on them, and the tie down straps 19 can be wrapped about the load and tightened to secure the load to the racks. When the strap is tightened, it bears against the outer walls 69 of the semi-annular openings 46 in end caps 41 and conforms to the curvature of those walls, as best seen in FIGS. 6-7. The frictional contact between the straps and the curved surfaces helps to keep the load from shifting. The arc length of the outer walls is greater than the width of the strap, and the strap is free to adjust its position along the walls to remain vertical even though one or both of the seat backs may be reclined. The curvature of the supporting surface of the base keeps that surface in proper contact with the load regardless of the seat back position. In FIG. 6, the seat back is vertical, and the strap is vertical, with the load resting on the center portion of the supporting surface. In FIG. 7, the seat back is inclined at an angle α, the strap is still vertical, and the load still rests squarely on the curved surface of the base.

In the embodiment illustrated, the racks are mounted on the front and rear passenger seats of an automobile. In a larger vehicle with additional seats, the racks could be mounted on any two of the seats. Thus, for example, the racks could be mounted on the second and third seats of a sports utility vehicle, or for longer loads, they could be mounted on the front seat and the third seat of the vehicle. Although the preferred arrangement is to have the seats on which the racks are installed aligned such that one seat is directly behind the other, it may also be possible to carry longer loads by mounting the racks on seats that are positioned diagonally of each other, e.g. the front passenger seat and a left rear passenger seat.

The invention has a number of important features and advantages. It provides a simple, economical way to safely and securely carry elongated loads inside an automobile or other passenger vehicle rather than attaching them to the outside of the vehicle or leaving them loose inside. It requires no tools for installation, and the posts are readily adjustable for use in headrest sockets having different sizes and spacings.

It is apparent from the foregoing that a new and improved seat-mounted rack assembly for carrying elongated loads in an automobile or other passenger vehicle has been provided. While only certain presently preferred embodiments have been described in detail, as will be apparent to those familiar with the art, certain changes and modifications can be made without departing from the scope of the invention as defined by the following claims.

The invention claimed is:

1. A rack assembly for carrying an elongated load in a passenger vehicle, comprising an automobile having at least two seats for carrying passengers, a pair of rack units mounted on the backs of two of the seats in place of headrests, each of the rack units having a horizontally extending base on which an end portion of the load can rest, a mounting post which extends downwardly from the base and into a headrest support socket in the seat back and is attached to the base member in a manner permitting the position of the post to be adjusted lengthwise of the base member, and a tie down strap for securing the load to the base.

2. A rack assembly for carrying an elongated load in a passenger vehicle, comprising a pair of rack units mounted on the backs of two seats in the vehicle in place of headrests, each of the rack units having an elongated, horizontally extending, rigid base member with generally semi-cylindrical top and side walls upon which end portions of the load can rest and a flat bottom wall, a mounting post extending downwardly from the base member and into a headrest support socket in the seat back, and a tie down strap for securing the load to the base member, the tie down strap passing lengthwise through the base member and exiting through openings with curved walls at opposite ends of the base member, with the strap in conforming engagement with the curved walls when tightened about the load.

3. The rack assembly of claim 2 wherein the base member extends in a direction parallel to the seat back and has a protective cover.

4. The rack assembly of claim 3 wherein the curved walls have an arc length greater than the width of the strap, and the strap can engage different portions of the curved walls and remain in a fixed orientation when the seat back is inclined at different angles.

5. The rack assembly of claim 3 wherein the base member has a longitudinally extending channel through which the strap passes, and the openings are formed in end caps which extend into end portions of the channel and abut against ends of the base member and a protective cover on the base member.

6. A seat-mounted rack for use in carrying an elongated load in a passenger vehicle, comprising an elongated base member having a rounded upper contour and a relatively flat bottom wall, a pair of mounting posts which extend downwardly from the base member and are attached to bottom wall in a manner permitting the spacing between the posts to be adjusted to correspond to the spacing between the mounting posts of different headrests found in passenger vehicles, a replaceable protective cover mounted on the base member, and a tie down strap which passes through a longitudinally extending channel in the base member and can be wrapped and secured about a load resting on the base member.

7. The rack of claim 6 wherein the cover is fabricated of a resilient material and has a plurality of longitudinally extending cleats for engagement with the load.

8. The rack of claim 6 wherein the cover conforms to the rounded upper contour of the base member and has lateral edge portions that hook beneath outer edge portions of the body and engage the bottom wall of the base member.

9. The rack of claim 6 wherein the mounting posts have shafts which can be inserted into headrest mounting sockets in the vehicle, and the upper ends of the shafts are in threaded engagement with T-nuts that are slidably received in a longitudinally extending slotted opening in the base member, with knobs affixed to the shafts for rotating the shafts to secure the posts to the base member with the bottom wall of the base member clamped between the T-nuts and the upper ends of the knobs.

10. The rack of claim 9 further comprising a plurality of adapter sleeves of different diameters interchangeably mounted on the shafts for use in headrest sockets of different diameters.

11. The rack of claim 6 wherein the tie down strap exits the base member through openings with curved walls at opposite ends of the base, with the strap in conforming engagement with the curved walls when tightened about the load.

12. The rack of claim 11 wherein the curved walls have an arc length greater than the width of the strap, and the strap can engage different portions of the curved walls and remain in a fixed orientation when the seat back is inclined at different angles.

13. The rack of claim 11 wherein the openings are formed in end caps which extend into end portions of the channel and abut against ends of the base member and cover.

14. A rack for carrying an elongated load in a passenger vehicle, comprising an elongated base member having a rounded upper contour and a relatively flat bottom wall; a protective cover on the base member; a channel of generally semi-annular cross section extending lengthwise through the base member; end caps which extend into end portions of the channel, abut against ends of the base member and cover, and have openings with curved walls in alignment with the channel; and a tie down strap which passes through the channel and through the openings in conforming engagement with the curved walls when tightened about the load.

15. The rack of claim 14 wherein the curved walls have an arc length greater than the width of the strap, and the strap can engage different portions of the curved walls and remain in a fixed orientation when a seat back on which the rack is mounted is inclined at different angles.

\* \* \* \* \*